United States Patent [19]

Chimner

[11] Patent Number: 5,090,783

[45] Date of Patent: Feb. 25, 1992

[54] FLOPPY DISK STORAGE ASSEMBLY

[76] Inventor: Scott W. Chimner, 2950 Robal Ct., Saline, Mich. 48176

[21] Appl. No.: 633,316

[22] Filed: Dec. 24, 1990

[51] Int. Cl.⁵ .............................................. A47F 1/04
[52] U.S. Cl. ...................................... 312/11; 312/305
[58] Field of Search ................ 312/305, 11, 125, 135, 312/223, 248; 108/22

[56] References Cited

U.S. PATENT DOCUMENTS

| | | | |
|---|---|---|---|
| 2,541,185 | 2/1951 | Adams | 312/305 |
| 3,765,738 | 10/1973 | Lobb | 312/11 |
| 4,052,113 | 10/1977 | Broome | 312/11 |
| 4,609,232 | 9/1986 | Florence | 312/11 |
| 4,708,408 | 11/1987 | Kennow | 312/11 |
| 4,826,261 | 5/1989 | Nademlejnsky | 312/11 |
| 4,938,549 | 7/1990 | Potter | 312/305 |
| 5,020,043 | 5/1991 | Kohler | 312/11 |

Primary Examiner—Kenneth J. Dorner
Assistant Examiner—Gerald A. Anderson
Attorney, Agent, or Firm—Reising, Ethington, Barnard, Perry & Milton

[57] ABSTRACT

A storage box for computer diskettes has a base, an enclosed cover with a front access opening, and a rotatable wheel with dividers configured to provide constant width storage compartments for diskettes; the storage compartments are accessible upon rotation of the wheel with respect to a front opening for inserting and removing diskettes with respect to the storage compartments. The base, enclosed cover, and rotatable wheel include a magnetic shield for protecting the diskettes when the storage box is supported at a fingertip location between an enclosure for a central processing unit and a monitor.

9 Claims, 2 Drawing Sheets 5,090,783

FLOPPY DISK STORAGE ASSEMBLY

FIELD OF THE INVENTION

This invention relates to storage devices for floppy diskettes and, more particularly, to storage devices for computer diskettes for use in association with a central processing unit (CPU) insertable during use.

BACKGROUND OF THE INVENTION

Personal computers are now widely used in which the media disk is ready by a three and one half inch (3.5") diskette drive system. As such personal computers become more powerful, a large number of the diskettes is required for both data storage and software backup. Presently, such diskettes are stored in lift top receptacles or free standing carousels which will hold from 30 to 100 disks. Such storage arrangements are typically stored on shelves adjacent the personal computer. They are cumbersome to use and impractical to keep at the user's finger tips.

SUMMARY OF THE INVENTION

In order to overcome the access and location problems associated with present day floppy diskette storage boxes, the present invention includes a storage box that is configured to be mounted on the enclosure for a CPU unit between it and a monitor.

The storage box of the present invention includes a rotatable wheel having a plurality of separate storage compartments thereon for finger tip retrieval and storage of a large number of diskettes. The storage box of the present invention includes an enclosed cover having a front opening to access the wheel for manual rotation to remove and replace data storage diskettes and back-up software diskettes for the CPU without having to move the storage box or without requiring that the user move from a keyboard or monitor. Further, the access opening is preferably formed in a front wall of the enclosed cover of the present invention so that the stored diskettes are located at the finger tips of the user at all times and at the location of a keyboard, CPU and an associated monitor.

Another feature of the invention is that the storage box of the present invention also serves as a housing for a surge protector and power switch for the CPU and a number of other accessories for the computer.

Still another feature of the invention is to provide a storage box of plastic material having magnetic shield properties.

An object of the present invention is to provide such a storage box having a disk holder therein with improved convenience and locatable beneath the computer monitor and atop the CPU so as to locate the user's diskettes at a finger tip location for both storage and retrieval.

Another object of the present invention is to improve the organization of a diskette holder for use with a CPU by the provision of a rotatable wheel with partitions thereon forming a large number of constant width storage compartments that will hold in excess of 100 diskettes and which can be sectioned into over 25 divisions.

Still another object of the invention is to reduce the space required to store large numbers of diskettes and the surge protector for personal computer applications and to do so by use of a storage box which fits on the top of a housing for a CPU and which includes a front opening for accessing a rotatable wheel for manually positioning the rotatable wheel for storing and retrieving diskettes from storage compartments on the rotatable wheel.

Yet another object of the present invention is to provide a media disk holder or storage box for preventing the loss and damage of media disks for a personal computer in which a housing has a base and an enclosed cover having a top, side walls and front and rear walls and a bottom edge connected to the base for securing the cover against removal therefrom; a pedestal mounted on the base extending upwardly thereof; a rotatable wheel member surrounding the pedestal; and integrally formed partitions on the rotatable wheel which diverge outwardly from the inside perimeter of said rotatable wheel toward the outer perimeter thereof to form generally rectangularly sectioned, constant width separate storage compartments at circumferentially located positions around the rotatable wheel member which are closed partially by a dependent reinforcing flange on the enclosed cover for holding disks in the wheel during rotation thereof.

A still further object of the present invention is to provide a storage box for media disks as set forth in the preceding object wherein the base has a center opening therein; the pedestal has a plurality of circumferentially spaced spring tabs thereon directed through the center opening and sprung radially outwardly into interlocked engagement with the base for holding the pedestal against axially movement with respect to the base.

Still another object of the present invention is to provide such a media disk storage box having bearing members for rotatably supporting the rotatable wheel including a pair of oppositely facing annular grooves formed respectively in the base and the rotatable wheel; and ball bearings in the grooves engageable with the rotatable wheel and the base and moveable along the grooves to provide an anti-friction support for the rotatable wheel.

Yet another object of the present invention is to provide such a media disk storage box with the cover having an annular inner wall integrally joined to the front wall and the rear wall; the annular inner wall having spaced parallel segments thereon forming an access opening through the front wall; and door means on the front wall for opening and closing the access opening.

Another object of the present invention is to provide such a media disk storage box having a surge protector located within the housing for connection to data processing devices including a central processing unit for supporting the base of the disk storage box.

These and other advantages, features and objects will become more apparent in view of the following description of the invention when taken in conjunction with the accompanying drawings in which:

DETAILED DESCRIPTION OF A PREFERRED EMBODIMENT OF THE INVENTION

Figure 1:
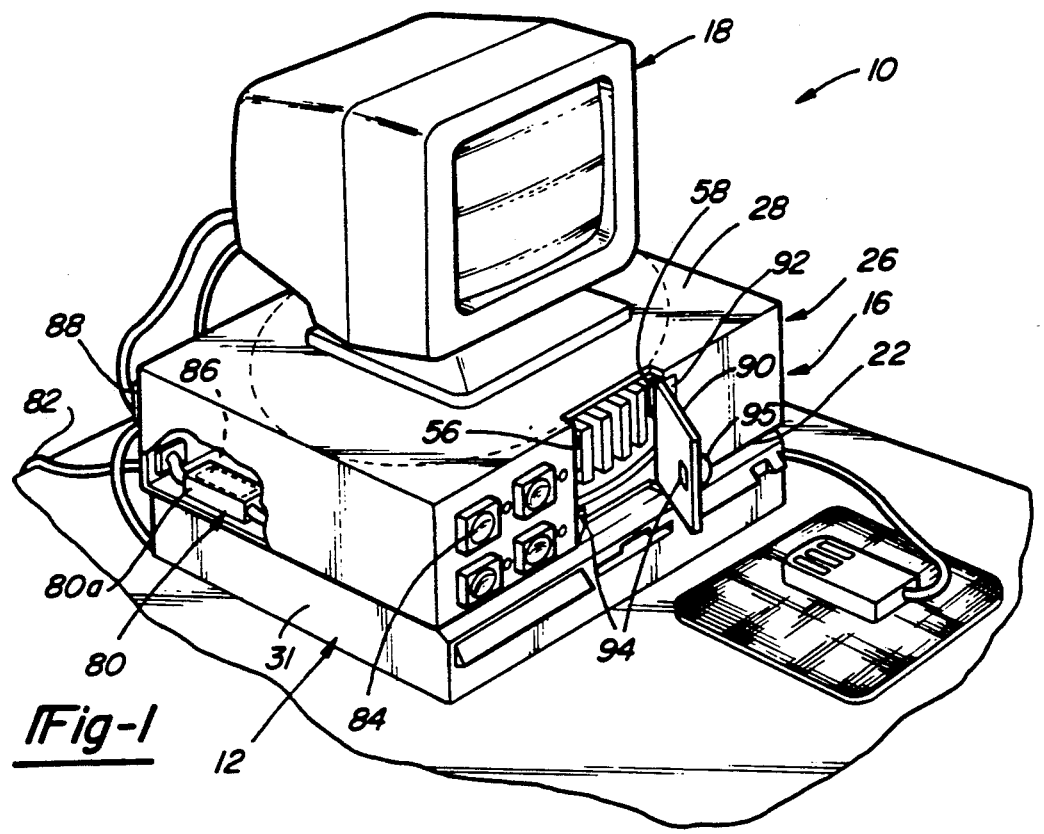
FIG. 1 is a perspective view of the invention in association with a housing for a CPU and a monitor for the CPU.

Referring to FIG. 1, a personal computer system 10 is shown in FIG. 1 including a housing 12 for a central processing unit (CPU) 14 with a media disk storage assembly 16 of the present invention supported atop the housing 12 and having a monitor 18 for the CPU supported on top of the assembly 16.

In accordance with the present invention, the media disk support assembly 16 is located at a finger tip location for the user of the system 10.

The assembly 16 includes a housing 20 having a base 22 which is substantially congruent with the footprint of the top of the housing 12. If desired, the base 22 can include a pad 24 at each corner thereof to raise the base 22 slightly above the top of the housing 12. The housing 20 further includes an enclosed cover 26 having a top 28. The top 28 has an integral dependent flange 30 which reinforces the cover 26 for supporting the monitor 18. The cover 26 further includes integral side walls 31, 32, a rear wall 34, a front wall 36 and a lower edge surface 38 which connects to the upper surface 22a of the base 22 for securing the cover 26 in place thereon.

Located interiorly of the housing 20 is a center pedestal 40 formed as a hollow cylinder which is aligned with a center opening 22b through the base 22. A plurality of equidistantly located circumferentially spaced spring fingers 42 on the pedestal 40 at one end thereof (one shown in FIGS. 3 and 4) fit through the center opening 22b and are sprung outwardly of the pedestal 40 to locate lock tabs 44 on the ends of the spring fingers 42 in interlocked engagement with the outer surface 22c of the base 22 to secure the pedestal 40 in place.

Figure 3:
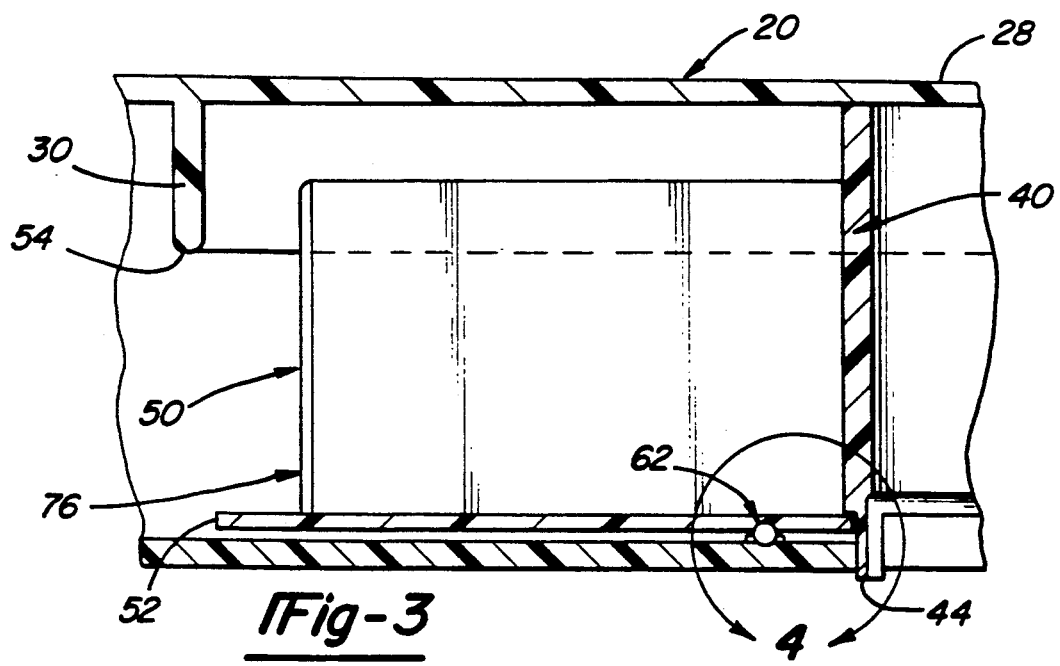
FIG. 3 is an enlarged fragmentary sectional view taken along the line 3—3 of FIG. 2 looking in the direction of the arrows.

The pedestal 40 further includes a notched end 46 which overlies the inner edge or I.D. 48 of a rotatable wheel or carousel 50. The rotatable wheel 50 has its outer perimeter or edge 52 located closely adjacent the annular flange 30 of the housing 20 at a point spaced below the lower edge 54 of the flange 30, as best seen in FIG. 3. The flange 30 is formed integrally with the front wall 36 at spaced parallel segments 56, 58 of the flange 30 that define a front opening 60 for accessing the rotatable wheel 50 for reasons to be discussed.

Figure 4:
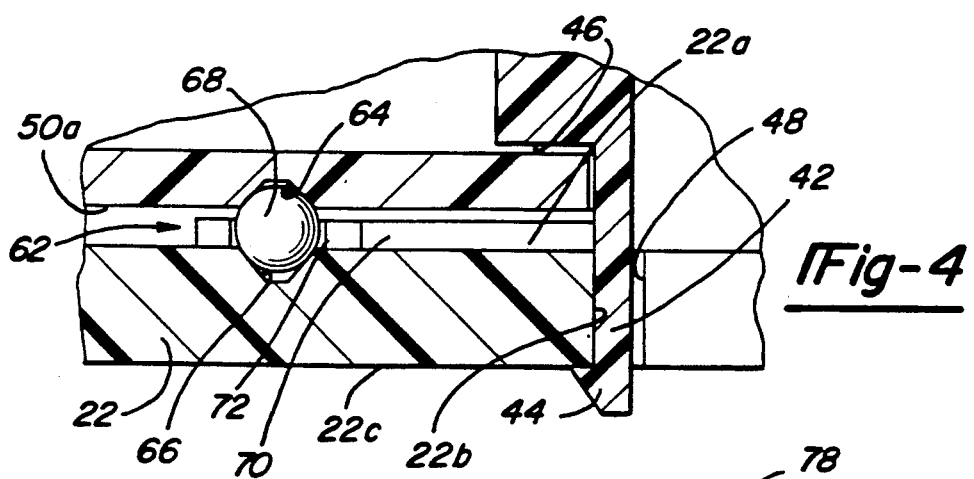
FIG. 4 is an enlarged sectional view of the region 4 in FIG. 3.
Figure 5:
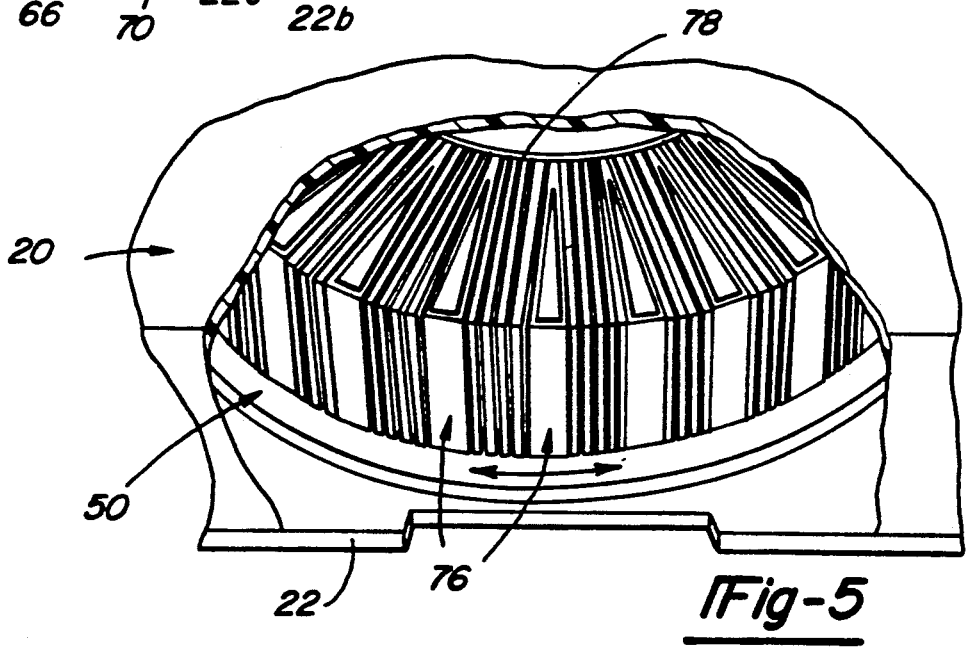
FIG. 5 is a fragmentary perspective view showing diskettes loaded on the rotatable wheel of FIG. 2.

The rotatable wheel 50 is supported on a friction reducing bearing assembly 62. The assembly 62 includes oppositely facing annular grooves 64, 66 formed respectively in the upper surface 22a of the base 22 and in the lower surface 50a of the rotatable wheel 50. The assembly 62 further includes a plurality of spaced ball bearings 68 supported in a bearing race 70 at holes 72 therein. The bearing race 70 is held between the retained inner edge 48 of the wheel 50 and the upper surface of the base 22 as is best shown in FIG. 4. By virtue of the above described bearing assembly 62, the rotatable wheel 50 is easily moved by manually grasping the edge 52 at the front opening 60 and spinning the wheel 50 to align storage compartments 74 with the front opening 60.

Figure 2:
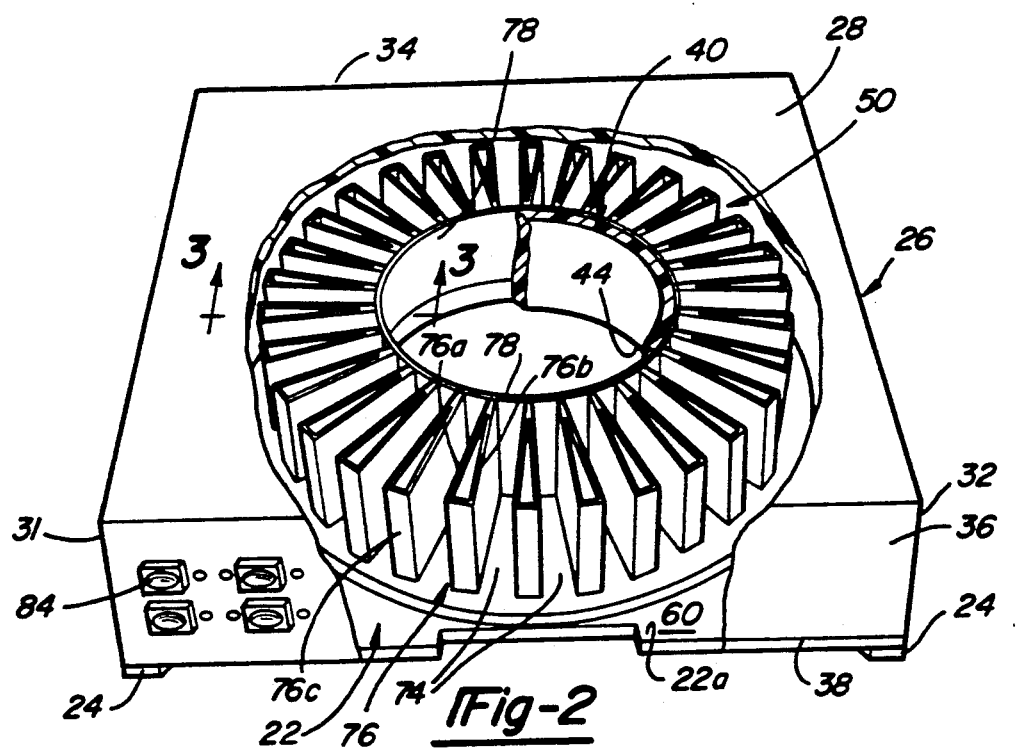
FIG. 2 is an enlarged perspective view of the invention, partially broken away to show a rotatable wheel.

One feature of the present invention is that the storage compartments 74 are formed as equally sized divisions of the rotatable wheel 50 for separately storing disks or diskettes, e.g., 3.5 inch media diskettes with a capacity of 1.44 megabytes. In the illustrated embodiment shown in FIG. 2, the rotatable wheel 50 has a plurality of integrally formed wedge shaped partitions 76 on either side of the compartments 74. The partitions 76 are formed as wedges by walls 76a, 76b which diverge outwardly from an inner wall 78 of the wheel 50 to to a point inboard of flange 30 where the walls 76a, 76b are joined to an end surface 76c on each partition 76. The wedge shaped partitions together form compartments 74 having a substantially uniform vertical cross-section from the front to the rear of the compartments 74.

Another feature of the invention is provided by locating the end surfaces 76c inboard of the flange 30 so that they will not bind thereagainst during rotation of wheel 50. The partitions 76 and flange 30 combine, however, to hold the diskettes in place during wheel rotation. The flange 30 will hold the diskettes in the wheel 50 in all positions except when a limited number of the compartments 74 are aligned with front opening 60.

In the illustrated embodiment, the compartments 74 are dimensioned to house six 3.5 inch diskettes vertically within the compartments 74. The wheel has twenty-five (25) separate compartments 74 forming a total capacity of 150 discs for both data storage and software backup.

Another feature of the invention is that a surge suppressor 80 can be located within the housing 20. The suppressor 80 has known circuitry for attenuating voltage spikes from a power supply for the computer system 16. It further includes a cable 82 for connection to the power supply, a switch 84 for connecting the cable through a suppressor circuit 86 and a plurality of plugs 88 to which the accessory devices for the computer system 16 can be connected.

The opening 60 for the housing 20 can have a door 90 connected to the front wall 36 by hinges 92. A suitable latch mechanism 94 holds the door closed against the housing 20 and a handle 96 is provided to move the door 90 to an open position such that the rotatable wheel 50 can be manually spun to locate specific ones of the compartments 74 into alignment with the opening 60 for retrieving and storing the media discs. When the door is opened, the side segments 56, 58 of the flange 30 provide a release path through the flange 30 for entry or removal of the diskettes. Alternatively, the door can be omitted.

In accordance with the invention, a housing 80a for the suppressor 80 can be made of injected molded plastic of a composition which will provide a magnetic shield against any magnetic fields generated by the surge suppressor 80.

While the invention has been discussed with respect to one kind of media diskette it will be recognized that the assembly is equally suitable for use with other sized media disks. By virtue of the above-described arrangement a computer user is able to find, use and return each disk to a proper storage location within a matter of seconds. The arrangement eliminates desktop clutter and eliminates the frustration of not having prior art disc containers at a finger tip location at all times.

While the invention has been described in an illustrative manner, it should be understood that it may be practiced other than as specifically described herein and yet remain within the scope of the appended claims.

What is claimed is:

1. A media disk storage assembly comprising a housing having a base and a cover;

said cover having a top, side walls and front and rear walls and a bottom edge connected to said base for securing said cover against removal therefrom;

a pedestal mounted on said base extending upwardly thereof;

a rotatable wheel surrounding said pedestal;

coacting means on said pedestal and said rotatable wheel member for interlocking said rotatable wheel member against axially movement with respect to said pedestal;

integrally formed partitions on said rotatable wheel which diverge outwardly from the inside perimeter of said rotatable wheel toward the outer perimeter thereof to form generally rectangularly sectioned separate storage compartments at circumferentially located positions around said rotatable wheel member;

means for rotatably supporting said rotatable wheel member on said base; and means in the front wall of said cover for forming an access opening from exteriorly of said housing for loading and removing floppy discs from each of said separate storage compartments.

2. The media disk storage assembly of claim 1 characterized by said base having a center opening therein; said pedestal having a plurality of circumferentially spaced spring tabs thereon directed through said center opening and sprung radially outwardly into interlocked engagement with said base for holding said pedestal against axially movement with respect to said base.

3. The media disk storage assembly of claim 1 characterized by said means for rotatably supporting said rotatable wheel including a pair of oppositely facing annular grooves formed respectively in said base and said rotatable wheel; and bearing means in said grooves engageable with said rotatable wheel and said base and moveable along said grooves to provide an anti-friction support for said rotatable wheel. .

4. The media disk storage assembly of claim 1 characterized by said cover having an annular flange integrally joined to said cover top and dependent therefrom to reinforce the top for supporting a monitor; said flange radially covering said storage compartments for holding disks therein during wheel rotation; said flange having spaced parallel segments thereon forming an access opening through said front wall.

5. The media disk storage assembly of claim 1 having surge protector means therein for connection to data processing devices including a computer processing unit for supporting the base of the disk storage assembly.

6. The media disk storage assembly of claim 1 characterized by said base having a center opening therein; said pedestal having a plurality of circumferentially spaced spring tabs thereon directed through said center opening and sprung radially outwardly into interlocked engagement with said base for holding said pedestal against axially movement with respect to said base;

said means for rotatably supporting said rotatable wheel including a pair of oppositely facing annular grooves formed respectively in said base and said rotatable wheel; and bearing means in said grooves engageable with said rotatable wheel and said base and moveable along said grooves to provide an anti-friction support for said rotatable wheel.

7. The media disk storage assembly of claim 1 characterized by said means for rotatably supporting said rotatable wheel including a pair of oppositely facing annular grooves formed respectively in said base and said rotatable wheel; and bearing means in said grooves engageable with said rotatable wheel and said base and moveable along said grooves to provide an anti-friction support for said rotatable wheel;

said cover having an annular flange dependent therefrom to radially cover said storage compartments as said wheel is rotated.

8. The media disk storage assembly of claim 1 characterized by said means for rotatably supporting said rotatable wheel including a pair of oppositely facing annular grooves formed respectively in said base and said rotatable wheel; and bearing means in said grooves engageable with said rotatable wheel and said base and moveable along said grooves to provide an anti-friction support for said rotatable wheel;

said cover having an annular flange dependent therefrom to radially cover said storage compartments as said wheel is rotated.

9. The media disk storage assembly of claim 1, characterized by including a surge protector cover being made of magnetic shield material.

* * * * *